United States Patent [19]
Argoudelis et al.

[11] 3,907,990
[45] Sept. 23, 1975

[54] ANTIBIOTICS ZERVACIN I AND ZERVACIN II AND PROCESS FOR PREPARING THE SAME

[75] Inventors: Alexander D. Argoudelis, Portage; LeRoy E. Johnson, Kalamazoo, both of Mich.

[73] Assignee: The Upjohn Company, Kalamazoo, Mich.

[22] Filed: Dec. 13, 1973

[21] Appl. No.: 424,624

[52] U.S. Cl. ............................................... 424/119
[51] Int. Cl. .......................................... A61k 21/00
[58] Field of Search ..................................... 424/119

[56] References Cited
UNITED STATES PATENTS
3,377,244   4/1968   Whaley et al. ...................... 424/119

Primary Examiner—Albert T. Meyers
Assistant Examiner—Daren M. Stephens
Attorney, Agent, or Firm—Roman Saliwanchik

[57] ABSTRACT

New antibiotics, zervacin I (U-43542) and zervacin II (U-43543), produced by the controlled fermentation of the known microorganism *Emericellopsis salmosynnemata*, strain 336, IMI 58330, NRRL 5773. These antibiotics are primarily active against Gram-positive bacteria with some activity against Gram-negative bacteria. Accordingly, they can be used in various environments to eradicate or control such bacteria.

5 Claims, 5 Drawing Figures

ANTIBIOTICS ZERVACIN I AND ZERVACIN II AND PROCESS FOR PREPARING THE SAME

BACKGROUND OF THE INVENTION

Though *Emericellopsis salmosynnemata* IMI 58330 is a known and available microorganism, it was not known, prior to the subject invention, that this microorganism could produce the antibiotics of the subject invention under controlled fermentation conditions. The prefix IMI refers to the Commonwealth Mycological Institute (formerly known as the Imperial Mycological Institute).

BRIEF SUMMARY OF THE INVENTION

The novel compounds of the invention, zervacin I and zervacin II, are obtained by culturing *Emericellopsis salmosynnemata*, strain 336, IMI 58330, NRRL 5773, in an aqueous nutrient medium under aerobic conditions. These compounds are polypeptide in nature and have the property of adversly affecting the growth of Gram-positive bacteria, for example, *Staphylococcus aureus*, *Streptococcus hemolyticus*, *Streptococcus faecalis*, *Bacillus subtilis*, *Diplococcus pheumoniae* and *Sarcina lutea*; they also demonstrate some Gram-negative activity and antiprotozoal activity. Accordingly, these antibiotics can be used alone or in combination with other antibiotic agents to prevent the growth of or reduce the number of bacteria, as disclosed above, in various environments.

DETAILED DESCRIPTION OF THE INVENTION

CHEMICAL AND PHYSICAL PROPERTIES OF ZERVACIN I

Elemental Analysis
  Found C, 56.49; H, 7.50; N, 13.26; O, 22.75 (by difference). Calculates for $C_{70}H_{114}N_{14}O_{21}$, Mol. Wt. 1486.
  Melting Point: 220.2° C. (uncorrected)
  Specific Rotation: $[\alpha]_D^{25} = +16°$ (c, 1.0, methanol)
  Ultraviolet Absorption Spectrum: In methanol:

| λ max (mμ) | a |
|---|---|
| 217 (sh) | 22.47 |
| 264 (sl.sh) | — |
| 268 (sl.sh) | — |
| 273 | 2.82 |
| 282 | 3.04 |
| 289 | 2.74 |
| 315 | 0.41 |

Figure 1:
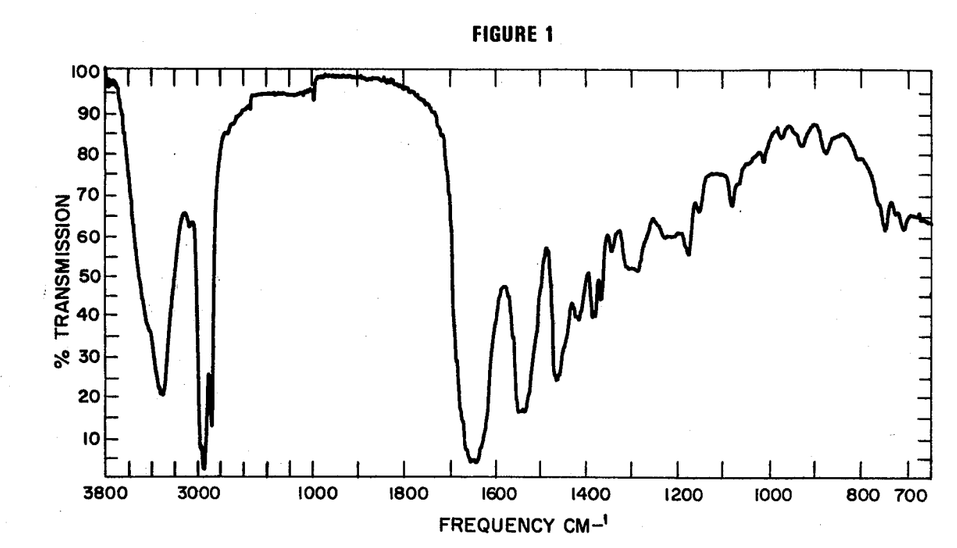

Potentiometric Titration:
  Potentiometric titration in 72% aqueous ethanol using aqueous hydrochloric acid as titrant showed the presence of a titratable group, pKa', 5.5
Solubilities:
  Zervacin I is soluble in dimethylformamide, dimethylsulfoxide and lower alcohols (1-4 carbon atoms, inclusive). It is less soluble in chlorinated hydrocarbon solvents and ethyl acetate. It is rather insoluble in acetone and ether, and completely insoluble in saturated hydrocarbon solvents.
Aminoacid Composition:
  A preparation of zervacin I was hydrolyzed with acid under standard conditions used for aminoacid analysis and the hydrolysate was analyzed for aminoacid content. Results are presented in Table A, infra.
Infrared Absorption Spectra:

Infrared absorption spectrum of zervacin I suspended in a mineral oil mull is reproduced in FIG. 1 of the drawing. Zervacin I shows peaks at the following wave lengths expressed in reciprocal centimeters:

| Band Frequency ($cm^{-1}$) | Intensity |
|---|---|
| 3400 (sh) | S |
| 3300 | S |
| 3060 | W |
| 2960 (oil) | S |
| 2920 (oil) | S |
| 2860 (oil) | S |
| 1645 | S |
| 1540 | S |
| 1460 (oil) | S |
| 1415 | M |
| 1380 | M |
| 1375 (oil) | M |
| 1367 | M |
| 1340 | M |
| 1300 (sh) | M |
| 1285 | M |
| 1225 | M |
| 1170 | M |
| 1150 | W |
| 1077 | W |
| 1007 | W |
| 970 | W |
| 925 | W |
| 870 | W |
| 800 | W |
| 740 | W |
| 720 (oil) | W |
| 702 | W |

Following is a tabulation of the infrared absorption spectrum wave lengths where the compound is pressed into a KBr pellet.

| Band Frequency ($cm^{-1}$) | Intensity |
|---|---|
| 3400 (sh) | S |
| 3320 | S |
| 3060 | M |
| 2960 | M |
| 2925 | M |
| 2870 | W |
| 1645 | S |
| 1535 | S |
| 1460 | M |
| 1435 | M |
| 1410 | M |
| 1380 | M |
| 1360 | M |
| 1335 | M |
| 1283 | M |
| 1210 | S |
| 1170 | S |
| 1145 | W |
| 1075 | W |
| 1005 | W |
| 925 | W |
| 872 | W |
| 742 | M |
| 700 | M |

Figure 2:
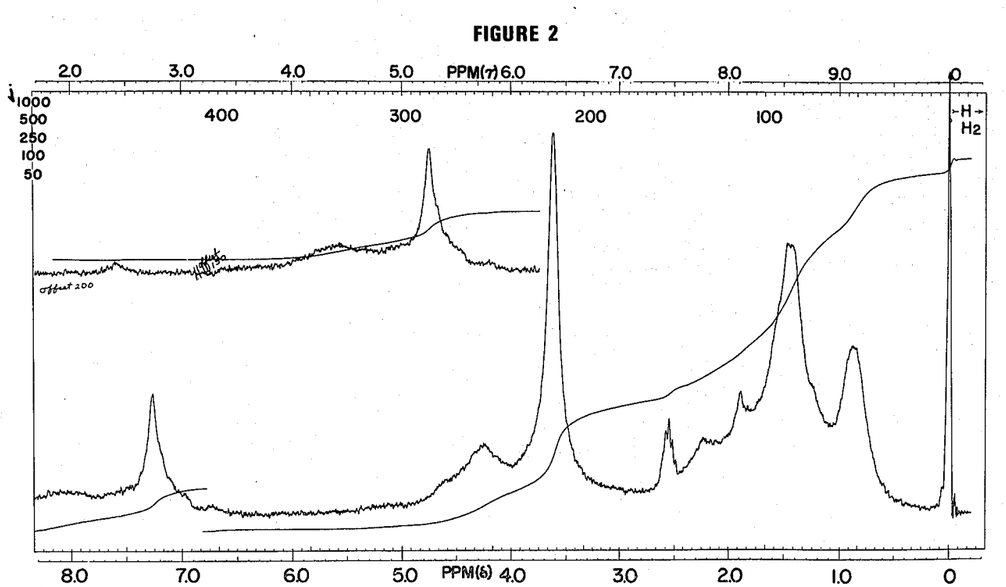

Infrared band intensities, throughout this disclosure, are indicated as S, M, and W, respectively, and are approximated in terms of the backgrounds in the vicinity of the bands. An S band is of the same order of intensity as the strongest in the spectrum; M bands are between ⅓ and ⅔ as intense as the strongest band; and, W bands are less than ⅓ as intense as the strongest band. These estimates are made on the basis of a percent transmission scale. sh denotes a shoulder.
Nuclear Magnetic Resonance (NMR):

The NMR spectrum of zervacin I is shown in FIG. 2 of the drawing. Spectra were observed with a Varian A-60 spectrometer on solutions (ca 0.4 ml., ca 0.25 M) of the compound in $d_6$-dimethylsulfoxide.

Appearance:

Zervacin I is a colorless crystalline material.

Figure 5:
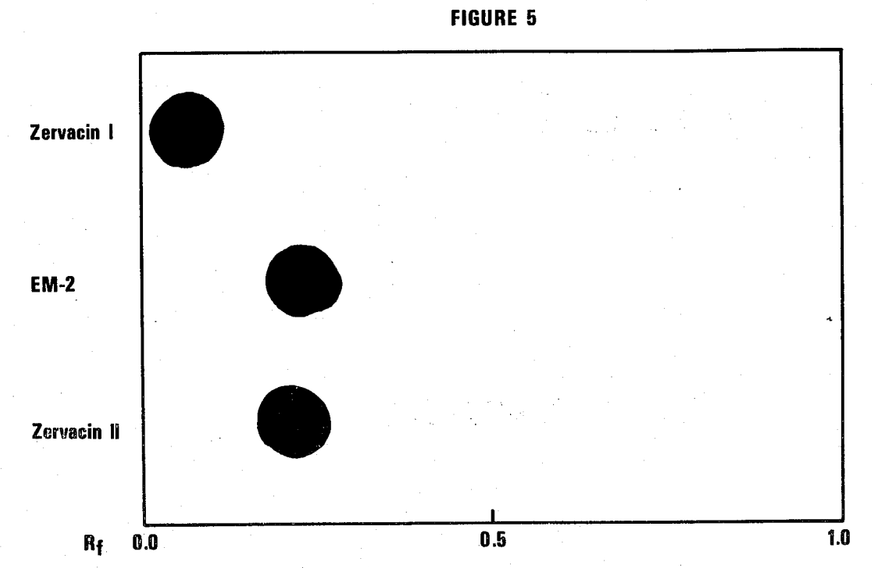

Thin Layer Chromatography (tlc): The tlc of zervacin I is shown in FIG. 5 of the drawing. Eastman's Chromagram silica gel was used as support and chloroform:methanol (6:1 v/v) as the solvent system. The presence of the antibiotic was detected by bioautography on *Sarcina lutea* - seeded trays.

CHEMICAL AND PHYSICAL PROPERTIES OF ZERVACIN II

Elemental Analysis

Found: C, 56.01; H, 7.60; N, 13.34; O, 23.05 (by difference). Calculates for $C_{93}H_{152}N_{19}O_{29}$, Mol. Wt. 1998.

Melting Point: 257.1° C. (uncorrected)

Specific Rotation: $[\alpha]_D^{25} = 4.5°$ (c, 1.0, methanol)

Ultraviolet Absorption Spectrum: In methanol:

| λ max (mμ) | a |
|---|---|
| 216 (sh) | 23.10 |
| 264 (sl.sh) | 2.22 |
| 268 (sh) | 2.46 |
| 274 | 2.67 |
| 281 | 2.86 |
| 289 | 2.52 |

Potentiometric Titration:

No titratable group was found when zervacin II was titrated in 72% aqueous ethanol with either sodium hydroxide or hydrochloric acid as the titrants.

Solubilities:

Zervacin II has the same solubilities as given above for zervacin I.

Aminoacid Composition:

A preparation of zervacin II was treated as given above for zervacin I for aminoacid analysis. The results are presented in Table A, infra.

Figure 3:
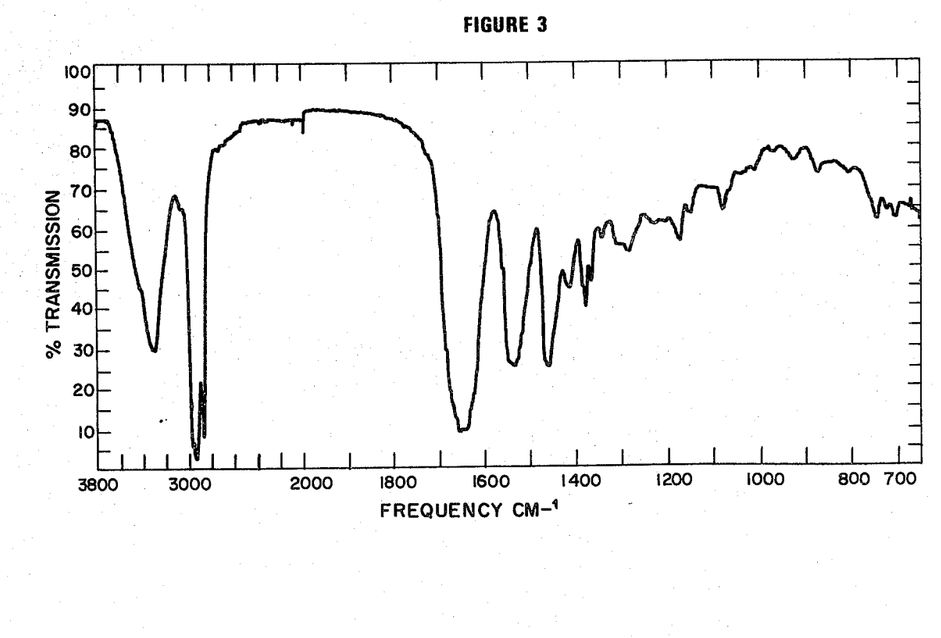

Infrared Absorption Spectra:

Infrared absorption spectrum of zervacin II suspended in a mineral oil mull is reproduced in FIG. 3 of the drawing. Zervacin II shows peaks at the following wave lengths expressed in reciprocal centimeters:

| Band Frequency (cm$^{-1}$) | Intensity |
|---|---|
| 3400 | S |
| 3300 | S |
| 3060 (sh) | S |
| 2960 (oil) | S |
| 2930 (oil) | S |
| 2860 (oil) | S |
| 1647 | S |
| 1535 | S |
| 1460 (oil) | M |
| 1410 | M |
| 1375 (oil) | M |
| 1368 | M |
| 1340 | M |
| 1300 | M |
| 1287 | M |
| 1230 | M |
| 1203 | M |
| 1170 | W |
| 1148 | W |
| 1076 | W |
| 1037 | W |
| 1007 | W |
| 967 | W |

-Continued

| Band Frequency (cm$^{-1}$) | Intensity |
|---|---|
| 925 | W |
| 870 | W |
| 803 | W |
| 740 | M |
| 718 (oil) | W |
| 702 | M |

Following is a tabulation of the infrared absorption spectrum wave lengths where the compound is pressed into a KBr pellet.

| Band Frequency (cm$^{-1}$) | Intensity |
|---|---|
| 3440 | S |
| 3320 | S |
| 3060 | M |
| 2970 | M |
| 2940 | M |
| 2880 | M |
| 1647 | S |
| 1535 | S |
| 1465 | M |
| 1435 | M |
| 1417 | M |
| 1382 | M |
| 1367 | M |
| 1337 | M |
| 1300 | M |
| 1285 | M |
| 1225 | M |
| 1172 | M |
| 1150 | W |
| 1077 | W |
| 1035 | W |
| 1007 | W |
| 970 | W |
| 925 | W |
| 875 | W |
| 800 | W |
| 742 | W |
| 702 | M |

Figure 4:
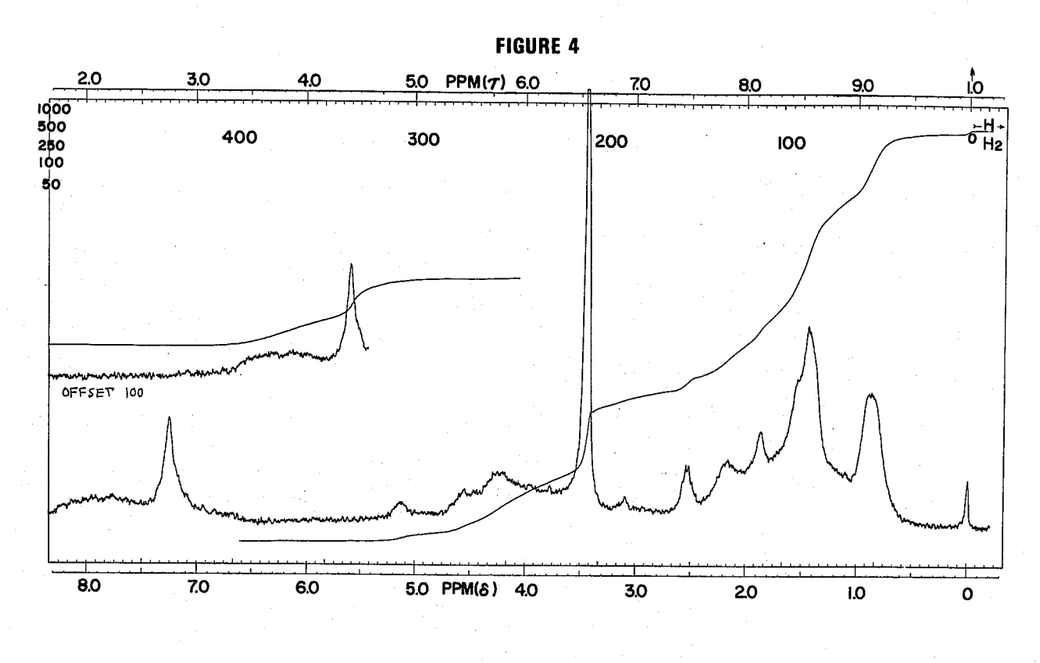

Nuclear Magnetic Resonance Spectrum (NMR):

The NMR spectrum of zervacin II is as shown in FIG. 4 of the drawing. This spectrum was conducted under the same conditions as disclosed above for the NMR spectrum of zervacin I.

Appearance:

Zervacin II is a colorless crystalline (needles) material.

Thin Layer Chromatography (tlc):

The tlc of zervacin II is shown in FIG. 5 of the drawing. Eastman's Chromagram silica gel was used as support and chloroform:methanol (6:1 v/v) as the solvent system. The presence of the antibiotic was detected by bioautography on *Sarcina lutea* - seeded trays.

Following Tables A and B are additional characterizations of the antibiotics of the subject invention. Table A gives the aminoacid composition of the antibiotics and also compares them with the related antibiotic known as Antibiotic EM-2. Table B gives the antibacterial spectrum of the antibiotics of the subject invention. This antibacterial spectrum was determined in a standard 2-fold broth dilution test in Brain Heart Infusion (BHI) broth, at a concentration of 1 mg./ml. Dimethylformamide was used to place the antibiotic compounds into solution. Test organisms requiring blood are cultured in blood, but the final antibiotic test is made in the absence of blood, since it has been found that adequate growth is obtained without it. Incubation is at 37° C. and the end points are read at 20 hours. Brain Heart Infusion broth (supplied by Difco Laboratories, Detroit, Michigan, U.S.A.) has the following composition:

| | |
|---|---|
| Calf brains, infusion from | 200 gm. |
| Beef heart, infusion from | 250 gm. |
| Bacto Proteose-peptone, Difco | 10 gm. |
| Bacto-Dextrose, Difco | 1 gm. |
| Sodium chloride | 5 gm. |
| Disodium phosphate | 2.5 gm. |
| Water | 1000 ml. |

TABLE A

Aminoacid Composition of Zervacin I, Zervacin II and Antibiotic EM-2

| Aminoacid | Zervacin I Wt (%) | Zervacin I μmoles per mg | Zervacin II Wt (%) | Zervacin II μmoles per mg | Antibiotic EM-2 Wt (%) | Antibiotic EM-2 μmoles per mg |
|---|---|---|---|---|---|---|
| Lysine | 3.38 | 0.212 | 1.89 | 0.118 | 3.18 | 0.221 |
| Hydroxyproline | 11.40 | 0.798 | 12.25 | 0.852 | 12.53 | 0.972 |
| Threonine | 3.96 | 0.305 | 4.30 | 0.330 | 5.01 | 0.427 |
| Serine | 1.00 | 0.087 | — | — | — | — |
| Glutamic Acid | 10.90 | 0.680 | 12.83 | 0.796 | 13.39 | 0.925 |
| Proline | 7.28 | 0.581 | 5.33 | 0.423 | 6.67 | 0.589 |
| Glycine | 0.74 | 0.091 | — | — | — | — |
| Alanine | 1.03 | 0.106 | — | — | — | — |
| α-Aminoisobutyric Acid | 4.20 | 0.382 | 2.63 | 0.238 | 3.44 | 0.346 |
| Valine | 1.48 | 0.116 | 1.18 | 0.093 | 1.78 | 0.154 |
| Isoleucine | 8.84 | 0.619 | 10.22 | 0.711 | 11.60 | 0.899 |
| Leucine | 6.10 | 0.427 | 6.02 | 0.419 | 7.02 | 0.544 |
| TOTAL | 60.31 | — | 56.65 | — | 54.62 | — |

TABLE B

Antibacterial Spectrum of Zervacin I and Zervacin II
Minimum Inhibitory Concentration (mcg/ml)

| Test Organism | UC Number* | Zervacin I | Zervacin II |
|---|---|---|---|
| S. aureus | 76 | 500 | 8 |
| S. aureus | 552 | 500 | 16 |
| S. hemolyticus | 152 | 16 | 4 |
| S. faecalis | 3235 | 62 | 8 |
| E. coli | 51 | 500 | 250 |
| P. vulgaris | 93 | 500 | 500 |
| K. pneumoniae | 57 | 500 | 250 |
| S. schottmuelleri | 126 | 500 | 250 |
| Ps. aeruginosa | 95 | 250 | 250 |
| B. subtilis | 564 | >500 | 8 |
| D. pneumoniae | 41 | 16 | 2 |
| S. lutea | 130 | 250 | 4 |

*UC refers to The Upjohn Company culture collection

The antibiotics of the subject invention also show antiprotozoal activity. The growth inhibition of the protozoa (Crithidia fasciculata, Tetrahymena pyriformis, and Ochromonas danica) was determined by 2-fold dilution end points in a medium consisting of:

| | |
|---|---|
| Glucose | 10 gm/l |
| Bacto Proteose-Peptone No. 3 (Difco) | 10 gm/l |
| Yeastolate (Difco) | 1 gm/l |

The protozoa were grown at 26° C. for 48 hours; diluted to a final concentration of 1:1000; and the dilution tubes then incubated at 26° C. for 48 hours and end points read.

Zervacin II is active against Crithidia fasciculata at 50 mcg/ml, Tetrahymena pyriformis at 25 mcg/ml and Ochromonas danica at 200 mcg/ml, while zervacin I showed no activity at 200 mcg/ml versus C. fasciculata and O. danica, but was active at 100 mcg/ml against T. pyriformis.

The infrared spectra and the presence of aminoacids in the antibiotic molecules indicate that the antibiotics belong to the "polypeptide" families. Extensive search showed the two antibiotics to be similar to antiamoebin [Hindustan Antibiotics Bulletin, 10, 287 (1958)] and stilbellin [J. Antibiotics, 24, 67 (1970)]. Antiamoebin and stilbellin have been reported to have the same aminoacid composition and appear to be identical (tlc, paper chromatography). Zervacins I and II have different aminoacid compositions from both antiamoebin and stilbellin and have been separated from antiamoebin and stilbellin by tlc.

Zervacin I has been differentiated from antibiotics EM-2, EM-3 and EM-4 by tlc and NMR spectra comparisons.

Zervacin II, the main antibacterial component produced by the culture, appears to be closely related to EM-2. However, a difference is seen in the NMR spectra of these antibiotics. A peak at δ 1.28, present in the spectrum of Antibiotic EM-2, is not present in the spectrum of zervacin II.

THE MICROORGANISM

The microorganism used for the production of the antibiotics of the subject invention is Emericellopsis salmosynnemata, strain 336, IMI 58330, NRRL 5773. A subculture of this microorganism can be obtained from the permanent collection of the Northern Utilization and Research Service, U.S. Department of Agriculture, Peoria, Ill., U.S.A.

The microorganism of this invention was studied and characterized by Alma Dietz of the Upjohn Research Laboratories.

Emericellopsis salmosynnemata, strain 336, IMI 58330, NRRL 5773, was derived from Cephalosporium salmosynnematum MDH 3590A, NRRL 2271, which produces the antibiotic synnematin as cited in U.S. Pat. No. 2,658,018. NRRL 2271 and a subculture ATCC 11661 were obtained for fermentation comparison studies with IMI 58330. IMI 58330 produces the zervacin antibiotics whereas the cultures obtained from NRRL and ATCC do not produce the zervacin antibiotics. Therefore, the IMI culture is designated Emericellopsis salmosynnemata strain 336, IMI 58330. In order to make the culture more readily available, it has been deposited with the U.S. Department of Agriculture culture repository at Peoria, Ill., as disclosed above.

The taxonomy for the subject microorganism is published in Mycologia Vol. 49, No. 3, May–June, 1957 at pages 305–306 and is as follows:

"Emericellopsis salmosynnemata sp. nov.

Cleistothecia globosa, glabra, 25–80 (−120) μ diam.; paries cleistothecii subhyalinus, translucidus. Asci incomposite dispositi, globosi vel sublobosi, octospori, 13–18μ, evanescentes. Ascosporate ellipsoideae, continuae, olivacco-brunneae, (6−)7-.5–8.5 (−10) × 4–5 (−5.5)μ, cum 3–5 alis vel cinctis linearibus 0.5–2μ altitudine inter polos extantibus; membrana sporae plerumque aspera.

Status conidicus est *Cephalosporium salmosynnematum* Roberts (Mycologia 44:304. 1952.).

Cleistothecia formed on cornmeal and oatmeal agar after 2–3 weeks at room temperature, abundant, visible macroscopically as very small black dots on the surface of the culture and within the medium, globose, glabrous, variable in size 25–80 (−120)μ diam., with a subhyaline, pseudoparenchymatous peridium through which the asci and spores may readily be viewed in position within the fruiting body. Asci few to many (only one or two in the smallest ascocarps), irregularly arranged, globose to subglobose, 13–18μ diam., 8-spored, with an evanescent wall. Ascospores unicellular, olivaceous to brown, elliptical, 6–10 × 4–5.5μ (most 7.5–8.5 × 4–5μ), often with a large oil droplet, and provided with 3–5 longitudinal wings or flanges 0.5–2μ wide, most of which extend from pole to pole of the spore and which have an undulating or sometimes ragged margin; the spore wall also often roughened with short papillae.

Homothallic; ascigerous stage obtained from single ascospores and single conidia."

The new compounds of the invention are produced when the elaborating organism is grown in an aqueous nutrient medium under submerged aerobic conditions. It is to be understood also that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include cornsteep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as components of the medium prior to sterilization of the medium.

Production of the compounds of the invention can be effected at any temperature conducive to satisfactory growth of the microorganism, for example, between about 18° and 40° C., and preferably between about 20° and 32° C. Ordinarily, optimum production of the compounds in obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of the new compounds and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compounds, as long as it is such that a good growth of the microorganism is obtained.

A variety of procedures can be employed in the isolation and purification of the compounds of the subject invention, for example, solvent extraction, partition chromatography, silica gel chromatography, liquid-liquid distribution in a Craig apparatus, absorption on resins, and crystallization from solvents.

In a preferred recovery process, the compounds of the subject invention are recovered from the culture medium by separation of the mycelia and undissolved solids by conventional means, such as by filtration or centrifugation. The antibiotics are then recovered from the filtered or centrifuged broth by extraction with a lower alcohol, for example, 1-butanol. The alcoholic extracts are concentrated to dryness to give a crude preparation of the antibiotics. This preparation can be used in environments, such as feed additives to animals and fish, where it is not necessary to separate the antibiotics into their individual entities or to have a high purity preparation.

Separation of the antibiotics from the alcoholic extract preparations is achieved by silica gel chromatography using silica gel (Merck-Darmstadt Art 7734) and the solvent system chloroform-methanol (6:1 v/v).

Another source of antibiotics from the fermentation disclosed herein is the filter cake from the filtration operation. In a preferred process, the filter cake is triturated with methanol and the methanol extracts are then subjected to silica gel chromatography, as described above, to give the individual antibiotics in their pure form.

The antibiotics of the invention are active against *Staphylococcus aureus* and Streptococcus faecalis and can be used to disinfect washed and stacked food utensils contaminated with these bacteria; they can also be used as disinfectants on various dental and medical equipment contaminated with *Staphylococcus aureus*. Further, since the antibiotics of the invention are active against *Streptococcus hemolyticus*, they can be used to disinfect instruments, utensils, or surfaces, where the inactivation of this microorganism is desirable.

It is to be understood that the microbiological process disclosed herein, though described in detail with reference to *Emericellopsis salmosynnemata* strain 336, NRRL 5773, is not limited to this particular microorganism or to microorganisms fully described by the cultural characteristics disclosed herein. It is intended that this invention also include other strains or mutants of the said microorganism which can be produced by procedures well known in the art, for example, by subjecting the novel microorganism to x-ray or ultraviolet radiation, nitrogen mustard, phage exposure, and the like.

Hereinafter are described non-limiting examples of the process and products of the subject invention. All percentages are by weight and all solvent mixture proportions are by volume unless otherwise noted.

EXAMPLE 1

Part A

FERMENTATION

A soil stock of *Emericellopsis salmosynnemata* strain 336, NRRL 5773, is used to inoculate a series of 500-ml. Erlenmeyer flasks, each containing 100 ml. of sterile seed medium consisting of the following ingredients:

| | |
|---|---|
| Glucose monohydrate | 10 gm/l |
| Bacto Peptone (Difco) | 10 gm/l |
| Bacto Yeast Extract (Difco) | 2.5 gm/l |
| Deionized water, pH is unadjusted | Balance |

The flasks are grown for 4 days at 28° C. on a Gump rotary shaker operating at 250 r.p.m.

Seed inoculum, described above, is used to inoculate a series of stippled 500-ml. Erlenmeyer flasks each containing 100 ml. of sterile fermentation medium. The inoculation rate is 5 ml. of seed inoculum per 100 ml. of fermentation medium. The fermentation medium consists of the following ingredients:

| | |
|---|---|
| Glucose Monohydrate | 45 gm/l |
| Buffalo starch* | 40 gm/l |
| Blackstrap molasses | 20 gm/l |
| Calcium carbonate | 8 gm/l |
| Potassium sulfate | 2 gm/l |
| Peptone (Wilson's s.p.), granular** | 25 gm/l |
| Tap water q.s. | Balance |

*A corn starch supplied by the Corn Products Corporation International.
**Supplied by the Wilson Pharmaceutical and Chemical Corporation, Chicago, Illinois.

The pH of the fermentation medium is adjusted to 7.2 with an aqueous solution of sodium hydroxide before sterilization. Three drops of Ucon (a synthetic defoamer supplied by Union Carbide, N.Y., N.Y.) is added per stippled flask. The inoculated fermentation flasks are incubated at a temperature of 28° C. on a Gump rotary shaker operating at 250 r.p.m. Harvest is usually after 192 hours of fermentation.

The total antibiotic titer of the fermentation beer can be monitored by use of a disc plate assay using the microorganism *S. lutea*. *S. lutea* is inoculated into the assay agar (Seed Agar Med. No. 1, BBL, Cockeysville, Md.) of the following composition:

| | |
|---|---|
| Gelysate Peptone | 6.0 gm/l |
| Trypticase Peptone | 4.0 gm/l |
| Yeast Extract | 3.0 gm/l |
| Beef Extract | 1.5 gm/l |
| Glucose | 1.0 gm/l |
| Agar | 15 gm/l |
| pH | 6.6±0.2 |

The plates are incubated at 28° C. for 18 hours.

Part B

RECOVERY

Whole fermentation beer (ca 6 liters harvested after 192 hours of fermentation), obtained as described above, is filtered using diatomaceous earth as a filter aid. The filter cake is washed with 1 liter of water. The clear beer and the wash is combined and kept as CB-wash (ca 5.4 liters). The filter cake is triturated 3 times using 1 liter of absolute methanol each time to give methanolic extracts labeled Me-1, 720 ml.; Me-2, 600 ml.; and Me-3, 830 ml.

The CB-wash (ca 5.4 liters) is extracted using 1200 ml. of 1-butanol. The butanolic extract (Bu-1) is separated from the spent beer (S-1). The spent beer is mixed with 1800 ml. of 1-butanol. Skellysolve B (isomeric hexanes - 7.7 liters) is added upon the formation of an emulsion. The resulting two phases of the emulsified mixture are separated. The upper phase (SSB ca 8 liters) is kept for evaluation and the aqueous phase (S-2) is extracted with 4 liters of 1-butanol to give a second butanolic extract, 3.5 liters (Bu-2) and spent-3 (S-3). S-3 is again extracted with 1-butanol (2.6 liters). The final butanolic extract is kept as Bu-3, 3.5 liters, and the final spent is kept as S-4, 3.7 liters. All of these fractions obtained by extraction of either the filter cake or the clear beerwash are tested for antibacterial activity against several bacteria on a standard agar difusion test. The results are as follows:

| Organisms | CB | Bu-1 | S-1 | SSB | Bu-2 | S-2 | Bu-3 | S-3 | S-4 | Me-1 | Me-2 | Me-3 |
|---|---|---|---|---|---|---|---|---|---|---|---|---|
| *S. lutea* | 11 | 14 | 9 | tr | 9 | tr | 8.5 | 0 | 0 | 10 | 9.5 | tr |
| *S. lutea*-124 | 9.5 | 12.5 | tr | 0 | 8 | 0 | 9.5 | 0 | 0 | 10.5 | 8 | 0 |
| *B. subtilis* | 0 | 9.5 | tr | 0 | 9 | 0 | 8 | 0 | 0 | 8 | tr | tr |
| *B. cereus* | 11 | 15 | 10 | 0 | 10 | tr | 9 | 0 | tr | 12.5 | 11.5 | 10 |
| *M. avium* | 0 | 14 | 10 | 0 | 11 | 0 | tr | 0 | 0 | 10.5 | 9 | 9 |
| *S. aureus* | 13.5 | 19 | 11 | 0 | 10 | 0 | tr | 0 | 0 | 12.5 | 11.5 | 0 |
| *K. pneumoniae* | 0 | tr | 0 | 0 | 0 | 0 | 0 | 0 | 0 | 0 | 0 | 0 |
| *P. vulgaris* | 10 | 13 | 11 | 0 | 10 | 9 | 9.5 | 0 | 10 | 13 | 12.0 | 12 |
| *E. coli* | tr | 8 | tr | 0 | tr | tr | tr | 0 | 0 | tr | tr | tr |
| *S. gallinarum* | tr | 11.5 | tr | 0 | 9 | tr | tr | 0 | 0 | 9.5 | 9 | 9.5 |
| *P. oxalicum* | 0 | 0 | 0 | 0 | 0 | 0 | 0 | 0 | 0 | tr | 0 | 0 |
| *S. schottmuelleri* | 0 | 0 | 0 | 0 | 0 | 0 | 0 | 0 | 0 | 0 | 0 | 0 |
| *P. aeruginosa* | 0 | 0 | 0 | 0 | 0 | 0 | 0 | 0 | 0 | 0 | 0 | 0 |

Zones of Inhibition (mm) Fraction

NOTE: tr = trace zone inhibition

The butanolic extracts Bu-1, Bu-2 and Bu-3 are concentrated to dryness to give Preparations ADA-139.1, ADA-139.2, and ADA-139.3, respectively. These preparations analyzed by tlc, as described previously, are found to be mixtures of the same antibiotics. They are therefore combined to give Preparation ADA-139.4, 35 gms.

Part C

PURIFICATION

Isolation of the Antibiotics Present in the Butanolic Extracts (Silica Gel Chromatography)

The column is prepared from 1.8 kg. of silica gel (Merck-Darmstadt Art 7734) packed in chloroform-methanol (6:1 v/v). Preparation ADA-139.4 (ca 35 gms.), prepared as described above, is dissolved in 250 ml. of the solvent chloroform-methanol (6:1 v/v), and this solution is mixed with 150 gms. of silica gel. The mixture is concentrated to dryness. The resulting dry powder is added on the top of the column. The column is eluted with the above solvent system. Fractions of 20 ml. are collected and analyzed by testing against *Sarcina lutea* after 25 fold concentration. Results follow:

| Fraction No. | Zone (mm) | Fraction No. | Zone (mm) |
|---|---|---|---|
| 5 | 0 | 90 | 0 |
| 10 | 0 | 95 | 0 |
| 15 | 0 | 100 | 0 |
| 20 | 0 | 105 | 0 |
| 25 | 0 | 110 | 0 |
| 30 | 0 | 115 | 0 |
| 35 | 0 | 120 | 0 |
| 40 | 0 | 125 | 0 |
| 45 | 0 | 130 | 0 |
| 50 | 0 | 135 | 0 |
| 55 | 0 | 140 | 0 |
| 60 | 0 | 145 | 0 |
| 65 | 0 | 150 | 0 |
| 70 | 0 | 155 | 0 |
| 75 | 0 | 160 | 0 |
| 80 | 0 | 165 | traces |
| 85 | 0 | 170 | 12.5 |
| 175 | 17.5 | 720 | 0 |
| 180 | 17 | 730 | 0 |
| 185 | 20 | 740 | 0 |
| 190 | 17 | 750 | 0 |
| 195 | 13.5 | 760 | 0 |
| 200 | 18.5 | 770 | 0 |
| 210 | 24 | 780 | 0 |
| 220 | 23.5 | 790 | 0 |
| 230 | 17 | 800 | 0 |
| 240 | 14.5 | 810 | 0 |
| 250 | 12 | 820 | 0 |
| 260 | 10 | 830 | 0 |
| 270 | 10 | 840 | 0 |
| 280 | 12 | 850 | 0 |
| 290 | 10.5 | 860 | 0 |
| 300 | 9 | 870 | 0 |
| 310 | traces | 880 | 0 |
| 320 | 0 | 890 | 0 |
| 330 | 0 | 900 | 0 |
| 340 | 0 | 910 | 0 |
| 350 | 0 | 920 | 0 |
| 360 | 0 | 930 | 0 |
| 370 | 0 | 940 | 0 |
| 380 | 0 | 950 | 0 |
| 390 | 0 | 960 | 0 |
| 400 | 0 | 970 | 0 |
| 410 | 0 | 980 | 0 |
| 420 | 0 | 990 | 0 |
| 430 | 0 | 1000 | 0 |
| 440 | 0 | 1010 | 0 |
| 450 | 0 | 1020 | 0 |
| 460 | 0 | 1030 | 0 |
| 470 | 0 | 1040 | 0 |
| 480 | 0 | 1050 | 0 |

-Continued

| Fraction No. | Zone (mm) | Fraction No. | Zone (mm) |
|---|---|---|---|
| 490 | 0 | 1060 | 0 |
| 500 | 0 | 1070 | 0 |
| 510 | 0 | 1080 | 0 |
| 520 | 0 | 1090 | 0 |
| 530 | 0 | 1100 | 0 |
| 540 | 0 | 1110 | 0 |
| 550 | 0 | 1120 | 0 |
| 560 | 0 | 1130 | 0 |
| 570 | 0 | 1140 | 0 |
| 580 | 0 | 1150 | 0 |
| 590 | 0 | 1160 | 0 |
| 600 | 0 | 1170 | 0 |
| 610 | 0 | 1180 | 0 |
| 620 | 0 | 1190 | 0 |
| 630 | 0 | 1200 | 0 |
| 640 | 0 | 1210 | 0 |
| 650 | 0 | 1220 | 0 |
| 660 | 0 | 1230 | 0 |
| 670 | 0 | 1240 | 0 |
| 680 | 0 | 1250 | 0 |
| 690 | 0 | 1260 | 0 |
| 700 | 0 | 1270 | 0 |
| 710 | 0 | 1280 | 0 |
| 1290 | 0 | 1860 | 0 |
| 1300 | 0 | 1870 | 0 |
| 1310 | 0 | 1880 | 0 |
| 1320 | 0 | 1890 | 0 |
| 1330 | 0 | 1900 | traces |
| 1340 | 0 | 1920 | 8 |
| 1350 | 0 | 1940 | 8 |
| 1360 | 0 | 1960 | 8 |
| 1370 | 0 | 1980 | 8 |
| 1380 | 0 | 2000 | 8 |
| 1390 | 0 | 2020 | 8.5 |
| 1400 | 0 | 2040 | 8.5 |
| 1410 | 0 | 2060 | 8 |
| 1420 | 0 | 2080 | 8.5 |
| 1430 | 0 | 2100 | 8.5 |
| 1440 | 0 | 2120 | 8.5 |
| 1450 | 0 | 2140 | 14 |
| 1460 | 0 | 2160 | 14.5 |
| 1470 | 0 | 2180 | 15 |
| 1480 | 0 | 2200 | 15 |
| 1490 | 0 | 2220 | 15.5 |
| 1500 | 0 | 2240 | 15.5 |
| 1510 | 0 | 2260 | 15.5 |
| 1520 | 0 | 2280 | 15.5 |
| 1530 | 0 | 2300 | 16 |
| 1540 | 0 | 2320 | 16 |
| 1550 | 0 | 2340 | 16 |
| 1560 | 0 | 2360 | 15.5 |
| 1570 | 0 | 2380 | 15.5 |
| 1580 | 0 | 2400 | 16 |
| 1590 | 0 | 2420 | 15 |
| 1600 | 0 | 2440 | 15 |
| 1610 | 0 | 2460 | 15 |
| 1620 | 0 | 2480 | 15.5 |
| 1630 | 0 | 2500 | 15 |
| 1640 | 0 | 2520 | 15 |
| 1650 | 0 | 2540 | 15 |
| 1660 | 0 | 2560 | 14 |
| 1670 | 0 | 2580 | 13.5 |
| 1680 | 0 | 2600 | 14 |
| 1690 | 0 | 2620 | 13 |
| 1700 | 0 | 2640 | 13 |
| 1710 | 0 | 2660 | 13 |
| 1720 | 0 | 2680 | 13 |
| 1730 | 0 | 2700 | 13 |
| 1740 | 0 | 2720 | 13 |
| 1750 | 0 | 2740 | 12.5 |
| 1760 | 0 | 2760 | 12.5 |
| 1770 | 0 | 2780 | 12.5 |
| 1780 | 0 | 2800 | 12.5 |
| 1790 | 0 | 2820 | 12.5 |
| 1800 | 0 | 2840 | 12.5 |
| 1810 | 0 | 2860 | 12 |
| 1820 | 0 | 2880 | 12 |
| 1830 | 0 | 2900 | 13 |
| 1840 | 0 | 2920 | 12 |
| 1850 | 0 | 2940 | 13 |
| 1960 | 13 | 4080 | 11.5 |
| 2980 | 12 | 4100 | 12 |
| 3000 | 12 | 4120 | 11 |
| 3020 | 12.5 | 4140 | 11 |
| 3040 | 12 | 4160 | 10.5 |
| 3060 | 12 | 4180 | 10.5 |
| 3080 | 11 | 4200 | 11 |
| 3100 | 10 | 4220 | 10 |
| 3120 | 12 | 4240 | 10 |
| 3140 | 12 | 4260 | 10 |
| 3160 | 13 | 4280 | 10 |

-Continued

| Fraction No. | Zone (mm) | Fraction No. | Zone (mm) |
|---|---|---|---|
| 3180 | 12 | 4300 | 9.5 |
| 3200 | 12 | 4320 | 10.5 |
| 3220 | 12 | 4340 | 10.5 |
| 3240 | 12.5 | 4360 | 10.5 |
| 3260 | 12.5 | 4380 | 11 |
| 3280 | 12.5 | 4400 | 11 |
| 3300 | 13 | 4420 | — |
| 3320 | 12.5 | 4440 | 11 |
| 3340 | 12.5 | 4460 | — |
| 3360 | 11.5 | 4480 | 10 |
| 3380 | 12 | 4500 | 10 |
| 3400 | 12.5 | 4540 | 9.5 |
| 3420 | 11 | 4580 | 8 |
| 3440 | 12 | 4600 | 8 |
| 3460 | 11 | 4620 | 0 |
| 3480 | 11 | 4660 | 0 |
| 3500 | 11 | 4700 | 0 |
| 3520 | 11.5 | 4740 | 0 |
| 3540 | 11 | 4780 | 0 |
| 3560 | 9.5 | 4820 | 0 |
| 3580 | 10 | 4860 | 0 |
| 3600 | 10 | 4900 | 0 |
| 3620 | 10 | 4940 | 0 |
| 3640 | 8.5 | 4980 | 0 |
| 3660 | 8.5 | 5000 | 0 |
| 3680 | 11 | | |
| 3700 | 11 | | |
| 3720 | 11 | | |
| 3740 | 10.5 | | |
| 3760 | 10.5 | | |
| 3780 | 10.5 | | |
| 3800 | 11 | | |
| 3820 | 10 | | |
| 3840 | 10.5 | | |
| 3860 | 10 | | |
| 3880 | 9.5 | | |
| 3900 | 10 | | |
| 3920 | 9.5 | | |
| 3940 | 9.5 | | |
| 3960 | 12 | | |
| 3980 | 12 | | |
| 4000 | 12 | | |
| 4020 | 12 | | |
| 4040 | 12 | | |
| 4060 | 11.5 | | |

Selected fractions from 1940 to 5000 are analyzed by tlc (silica gel, chloroform-methanol, 6:1 v/v). On the basis of the results of bioactivity determination and tlc, the following pools are made. Each pool is concentrated to dryness to give the following preparations:

| Pool | Fractions | Prep. | |
|---|---|---|---|
| I, | 168–192 | ADA-7.1, | 4.0 g. |
| II, | 198–250 | ADA-7.2, | 2.5 g. |
| III, | 1930–2120 | ADA-18.1, | 0.25 g. |
| IV, | 2140–2550 | ADA-18.2, | 1.50 g. |
| V, | 2551–3198 | ADA-18.3, | 1.78 g. |
| VI, | 3200–3800 | ADA-18.4, | 2.60 g. |
| VII, | 3801–4900 | ADA-18.5, | 3.30 g. |

Tlc analysis of the above preparations show that ADA-18.2 and ADA-18.3 contain zervacin II. These preparations are combined to give Preparation ADA 28.1 3.3 gms. This preparation is dissolved in 30 ml. of methanol. The solution is heated on a steam bath. Water, 80 ml., is added to the warm solution. Crystallization of zervacin II starts almost immediately after the addition of the water. The mixture is allowed to stand at room temperature for 24 hours; yield, 1.92 gms. of crystalline zervacin II.

This material is recrystallized, as described above, from 30 ml. of methanol and 80 ml. of water to give 1.6 gms. of a highly purified crystalline preparation of zervacin II.

Preparation ADA-18.5, prepared as described above, is shown by tlc to contain mainly zervacin I. 2.3 gms. of this preparation is dissolved in 9 ml. of methanol and 9 ml. of acetone. The solution is clarified by filtration. The filter is washed with a solution of 2 ml. of methanol and 8 ml. of acetone. The resulting clear solution, 28 ml. is mixed with 225 ml. of acetone. Crystallization of zervacin I starts almost immediately. The mixture is allowed to stand at room temperature for 24 hours. Crystals of zervacin I are isolated and dried; yield, 1.32 gms.

We claim:

1. Antibiotic zervacin I, which is active against various Gram-positive bacteria, and in its essentially pure crystalline form
   a. has the following elemental analyses: C, 56.49; H, 7.50; N, 13.26; O, 22.75 (by difference);
   b. has a melting point of 220.2° C.;
   c. has a specific rotation $[\alpha]_D^{25} = +16°$ (c, 1.0, methanol);
   d. has the following ultraviolet absorption spectrum In methanol:

| λ max (mμ) | a |
|---|---|
| 217 (sh) | 22.47 |
| 264 (sl.sh) | — |
| 268 (sl.sh) | — |
| 273 | 2.82 |
| 282 | 3.04 |
| 289 | 2.74 |
| 315 | 0.41 | e. is soluble in dimethylformamide, dimethylsulfoxide and lower alcohols; is less soluble in chlorinated hydrocarbon solvents and ethyl acetate; is rather insoluble in acetone and ether;
   f. has a characteristic infrared absorption spectrum when suspended in mineral oil mull as shown in FIG. 1 of the drawing;
   g. has a characteristic nuclear magnetic resonance spectrum as shown in FIG. 2 of the drawing; and
   h. has a characteristic chromatographic pattern as shown in FIG. 5 of the drawing.

2. Antibiotic zervacin II, which is active against various Gram-positive bacteria, and which in its essentially pure crystalline form
   a. has the following elemental analyses: C, 56.01; H, 7.60; N, 13.34; O, 23.05 (by difference);
   b. has a melting point of 257.1° C.;
   c. has a specific rotation $[\alpha]_D^{25} = 4.5°$ (c, 1.0, methanol);
   d. has the following ultraviolet absorption spectrum In methanol:

| λ max (mμ) | a |
|---|---|
| 216 (sh) | 23.10 |
| 264 (sl.sh) | 2.22 |
| 268 (sh) | 2.46 |
| 274 | 2.67 |
| 281 | 2.86 |
| 289 | 2.52 | e. is soluble in dimethylformamide, dimethylsulfoxide and lower alcohols; is less soluble in chlorinated hydrocarbon solvents and ethyl acetate; is rather insoluble in acetone and ether;
   f. has a characteristic infrared absorption spectrum when suspended in mineral oil mull as shown in FIG. 3 of the drawing;

g. has a characteristic nuclear magnetic resonance spectrum as shown in FIG. 4 of the drawing; and h. has a characteristic chromatographic pattern as shown in FIG. 5 of the drawing.

3. A process for preparing the antibiotics zervacin I as described in claim 1 and zervacin II as described in claim 2, which comprises cultivating *Emericellopsis salmosynnemata*, strain 336, NRRL 5773, in an aqueous nutrient medium under aerobic conditions until substantial antibiotic activity is imparted to said medium by the production of antibiotics zervacin I and zervacin II.

4. A process, according to claim 3, wherein said aqueous nutrient medium contains a source of assimilable carbohydrate and assimilable nitrogen.

5. A process, according to claim 3, wherein said antibiotics zervacin I and zervacin II are isolated from the fermentation broth.

* * * * *